US012202159B2

(12) United States Patent
Griffin et al.

(10) Patent No.: US 12,202,159 B2
(45) Date of Patent: Jan. 21, 2025

(54) SHAVING RAZOR ACCESSORY

(71) Applicant: SL SHAVECO LLC, Beverly, MA (US)

(72) Inventors: John W. Griffin, Moultonborough, NH (US); Craig A. Provost, Newport Beach, CA (US); William E. Tucker, Plymouth, MA (US)

(73) Assignee: SL SHAVECO LLC, Beverly, MA (US)

( * ) Notice: Subject to any disclaimer, the term of this patent is extended or adjusted under 35 U.S.C. 154(b) by 0 days.

(21) Appl. No.: 18/332,954

(22) Filed: Jun. 12, 2023

(65) Prior Publication Data

US 2024/0083052 A1 Mar. 14, 2024

Related U.S. Application Data

(60) Continuation of application No. 17/815,598, filed on Jul. 28, 2022, now abandoned, which is a continuation of application No. 16/547,170, filed on Aug. 21, 2019, now abandoned, which is a division of application No. 15/510,436, filed as application No. PCT/US2015/049298 on Sep. 10, 2015, now abandoned.

(60) Provisional application No. 62/049,838, filed on Sep. 12, 2014.

(51) Int. Cl.

| | |
|---|---|
| ***B26B 21/52*** | (2006.01) |
| ***A45D 27/02*** | (2006.01) |
| ***B26B 21/22*** | (2006.01) |
| ***B26B 21/40*** | (2006.01) |
| ***B26B 21/44*** | (2006.01) |

(52) U.S. Cl.
CPC ............ *B26B 21/521* (2013.01); *A45D 27/02* (2013.01); *B26B 21/225* (2013.01); *B26B 21/4012* (2013.01); *B26B 21/44* (2013.01)

(58) Field of Classification Search
CPC . B26B 21/521; B26B 21/225; B26B 21/4012; B26B 21/44; B26B 21/22; A45D 27/02
See application file for complete search history.

(56) References Cited

U.S. PATENT DOCUMENTS 2,073,502 A * 3/1937 Stargardter ............. B26B 21/54 30/346.53
3,895,437 A 7/1975 Dibuono
5,953,825 A 9/1999 Christman et al.
(Continued)

FOREIGN PATENT DOCUMENTS

FR 2660589 A1 10/1991
WO WO1997037819 * 10/1997
WO 2014066183 A1 5/2014

OTHER PUBLICATIONS

Search Report and Written Opinion—Corresponding PCT Application No. PCT/US15/49298, dated Dec. 7, 2015, 9 pages.
(Continued)

*Primary Examiner* — Evan H MacFarlane
*Assistant Examiner* — Fernando A Ayala
(74) *Attorney, Agent, or Firm* — Leber IP Law; Celia H. Leber

(57) ABSTRACT

Shaving razors and cartridges are featured which include one or more removably attachable shaving aid accessories.

15 Claims, 7 Drawing Sheets

(56) References Cited

U.S. PATENT DOCUMENTS

| | | | | |
|---|---|---|---|---|
| 6,122,826 | A * | 9/2000 | Coffin | B26B 21/225 30/527 |
| 6,481,104 | B1 | 11/2002 | Parker et al. | |
| 6,886,254 | B1 | 5/2005 | Pannella | |
| 7,103,976 | B2 | 9/2006 | Pennella | |
| 8,037,609 | B2 | 10/2011 | Nicoll | |
| 8,191,263 | B2 | 6/2012 | Follo et al. | |
| 9,259,846 | B1 | 2/2016 | Robertson | |
| 9,434,080 | B2 | 9/2016 | Bozikis | |
| 9,999,980 | B2 | 6/2018 | Antoniou et al. | |
| 2005/0172495 | A1 | 8/2005 | Pennella | |
| 2005/0278954 | A1* | 12/2005 | Orloff | B26B 21/44 30/32 |
| 2006/0080837 | A1 | 4/2006 | Johnson et al. | |
| 2006/0272155 | A1 | 12/2006 | Mehta et al. | |
| 2008/0209734 | A1 | 9/2008 | Nicoll | |
| 2010/0018365 | A1 | 1/2010 | Tyler | |
| 2010/0139103 | A1 | 6/2010 | Miyazaki | |
| 2011/0276061 | A1 | 11/2011 | Pfeiffer et al. | |
| 2012/0119869 | A1 | 5/2012 | Yamamoto | |
| 2013/0312265 | A1 | 11/2013 | Wilson et al. | |
| 2013/0312272 | A1 | 11/2013 | Wilson et al. | |
| 2014/0096402 | A1* | 4/2014 | Nakasuka | B26B 21/521 30/531 |
| 2014/0116211 | A1 | 5/2014 | Griffin et al. | |
| 2014/0230258 | A1 | 8/2014 | Eagleton et al. | |
| 2014/0237830 | A1 | 8/2014 | Wilson et al. | |
| 2014/0245612 | A1 | 9/2014 | Good et al. | |
| 2014/0366380 | A1 | 12/2014 | Good | |
| 2015/0174774 | A1 | 6/2015 | Hodgson | |
| 2015/0174775 | A1* | 6/2015 | Hodgson | B26B 21/521 30/527 |
| 2015/0174776 | A1 | 6/2015 | Hawes | |
| 2015/0360377 | A1 | 10/2015 | Tomassetti | |
| 2016/0121495 | A1 | 5/2016 | Johnson | |
| 2016/0121496 | A1 | 5/2016 | Johnson | |
| 2016/0121498 | A1 | 5/2016 | Johnson | |
| 2017/0043492 | A1 | 2/2017 | Robertson et al. | |

OTHER PUBLICATIONS

European Patent Application No. 15840888.0, Extended European Search Report dated Apr. 18, 2018, 8 pages.

* cited by examiner

SHAVING RAZOR ACCESSORY

RELATED APPLICATIONS

This application is a continuation of U.S. patent application Ser. No. 17/815,598, filed Jul. 28, 2022, which is a continuation of Ser. No. 16/547,170, filed Aug. 21, 2019, which is a divisional application of U.S. patent application Ser. No. 15/510,436, filed Mar. 10, 2017, which is a national phase entry of International Patent Application No. PCT/US2015/49298, filed Sep. 10, 2015, which claims priority from U.S. Patent Application Ser. No. 62/049,838, filed Sep. 12, 2014, the entire disclosures of which are incorporated herein by reference.

BACKGROUND

Some shaving systems incorporate soap elements in the design of the shaving cartridge. These cartridges are often referred to as a "2-in-1 type razor cartridge" since there is no initial lathering step when shaving. More specifically, with these systems there is generally no need to utilize a separate shave gel/cream, soap, etc. Examples of 2-in-1 razor cartridges are readily available in the marketplace, for example the Gillette® Venus® Breeze™ razor cartridge, and the cartridges of the Schick® Intuition® and Intuition Plus® razor products.

In the case of the Schick® Intuition® razor cartridge, there is a soap ring disposed around the periphery of the cartridge. In the case of the Gillette Venus® Breeze® razor cartridge, there are two shaving aid elements, generally comprising a shaving aid holder having a shaving aid material or composition (e.g., a shaving aid portion) disposed thereon, which may be in the form of gel bars or soap elements. These shaving aid portions are formed by overmolding onto shaving aid holders, the latter often referred to as "wings." The attachment of the shaving aid portion to each wing is typically accomplished by embedding the wing within the bulk of the shaving aid. The shaving aid elements are not readily removable from the cartridge by the user.

SUMMARY

Generally, this invention relates to shaving razors, shaving cartridges and to shaving accessories for shaving razors. More particularly the invention relates to shaving accessories designed to improve the shaving experience for the user by allowing the user to apply various shaving aids to the skin during shaving.

In one aspect, the invention features a shaving razor comprising a handle, a shaving cartridge, having a plurality of blades, mounted on the handle, and a shaving accessory removably mounted on the handle by a magnetic attachment.

Some implementations of the invention may include one or more of the following features. The shaving accessory may be dimensioned to fit around the shaving cartridge. The shaving accessory may be removably attached to the shaving razor by engagement of one or more ferrous elements with one or more magnets. The ferrous elements may be disposed on the accessory and the magnets may be disposed on the handle. The razor may further comprise at least one magnet mounted on the handle for removable engagement with a corresponding surface of the body. The razor may include at least two magnets and two ferrous elements. The shaving accessory may be attached to the handle by a flexible band.

The shaving accessory may include a shaving aid element configured to contact a user's skin while shaving. The shaving accessory may comprise a body defining an aperture configured to receive the cartridge, and the shaving aid may be disposed on a surface of the body. The surface of the body may be configured to allow the accessory to pivot relative to the handle. The surface may be arcuate. The surface may comprise a ferric material. The body may be composed entirely of a ferric material. A portion of the body may be coated with a ferric material. The body may include a frame and ferrous elements mounted on the frame.

The shaving aid element may include a shaving aid. The shaving aid may have exfoliating characteristics. The shaving aid may have lubricating characteristics. The shaving aid may have moisturizing characteristics. The shaving aid may have lathering characteristics. The shaving aid element may be in the form of a generally oval ring. The shaving aid may be in the form of a plurality of discrete elements.

DETAILED DESCRIPTION

The present disclosure relates generally to shaving razors and to shaving razor accessories that improve the user shaving experience and performance of the shaving razor. The shaving razor accessories are removably mounted on a portion of the razor handle and positioned so that they surround the razor cartridge. More particularly, shaving razor accessories can be easily affixed to and removed from a shaving razor as needed. The shaving razor accessories can be configured with a variety of different shaving aids, which will be discussed in detail at a later point. These features allow a user to select a desired shaving product to apply to the skin, and to remove the accessory to shave difficult, delicate or small areas.

The shaving razor accessory attachment will henceforth be referred to as the shaving accessory.

Figure 1:
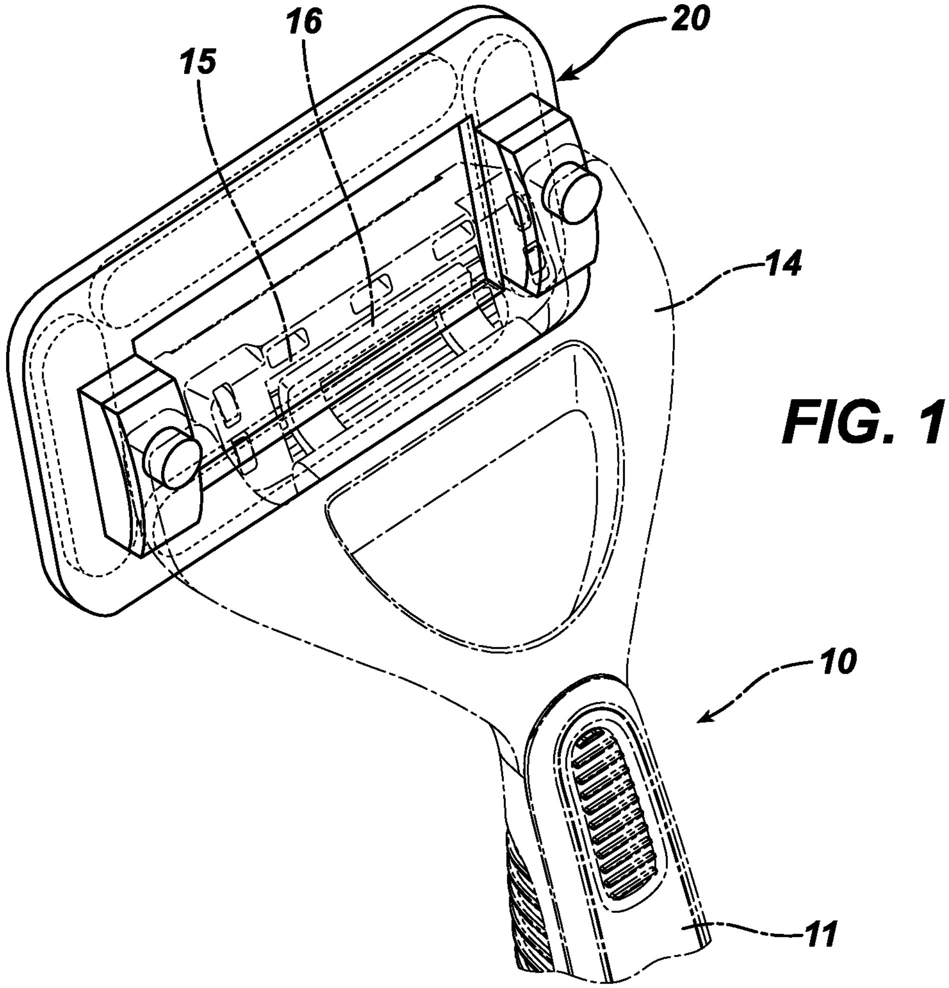
FIG. 1 is a top-perspective view of a shaving razor accessory according to one embodiment, mounted on a shaving razor.
Figure 1A:
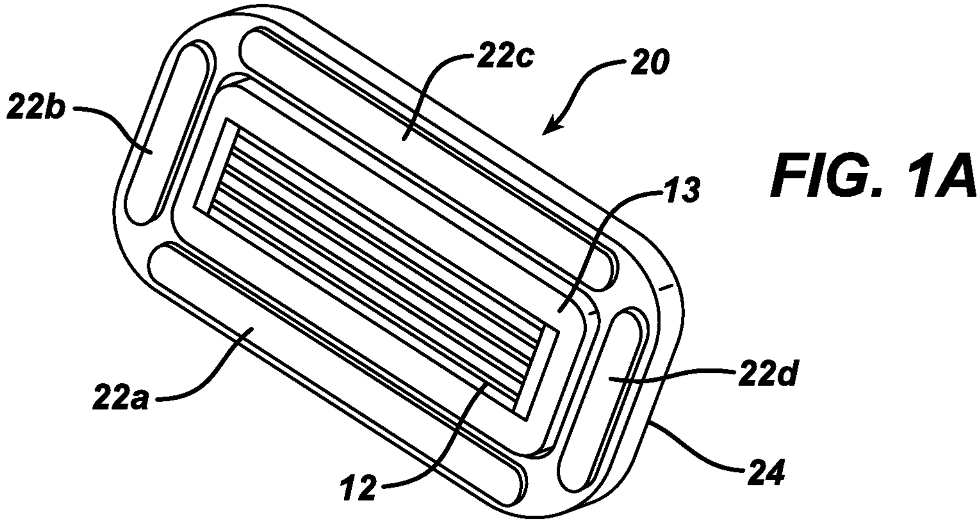
FIG. 1A is a bottom-perspective view of the accessory and cartridge shown in FIG. 1, without the shaving razor handle.
Figure 2:
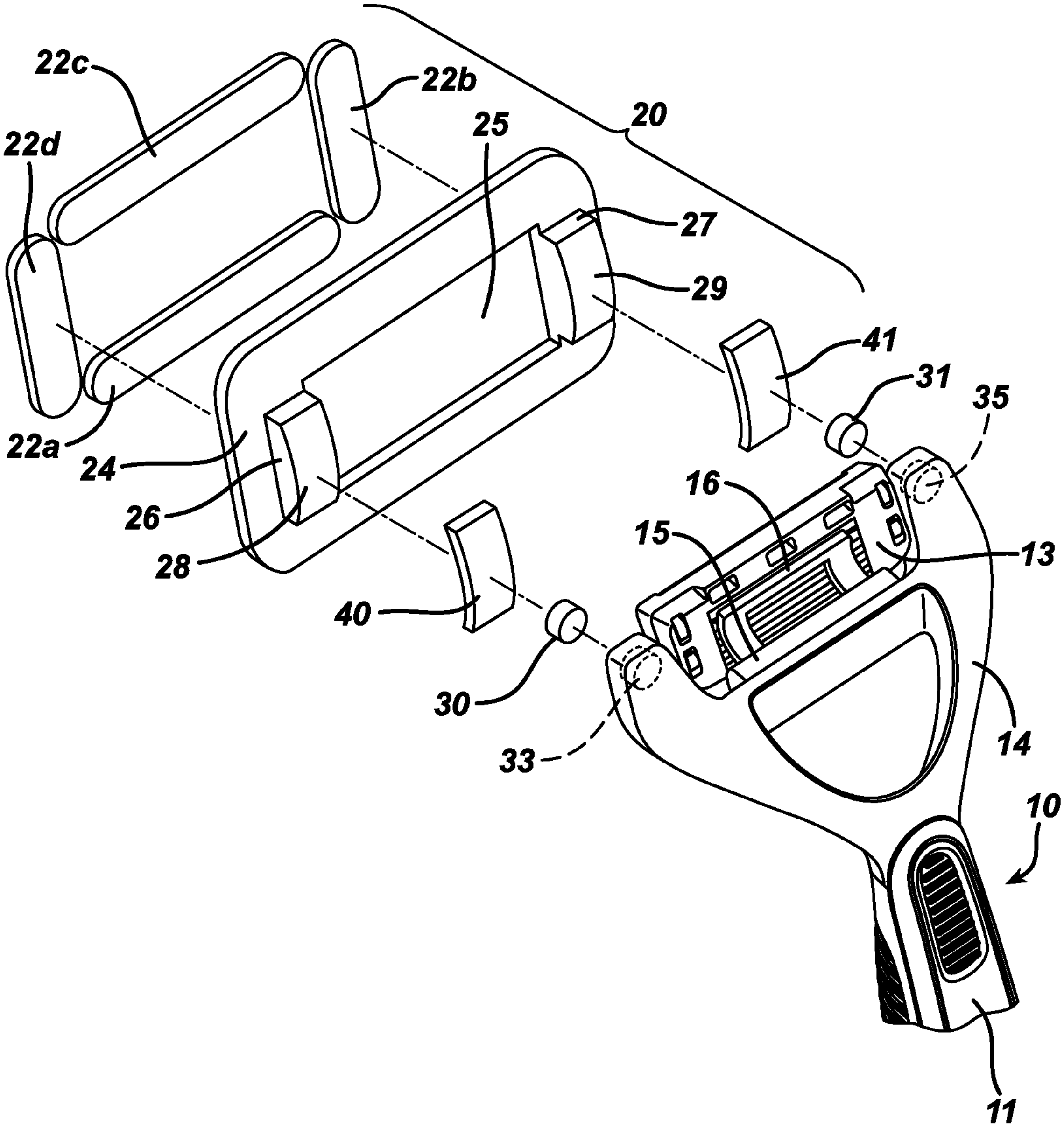
FIG. 2 is an exploded perspective view of the accessory shown in FIG. 1.

Referring to FIGS. 1, 1A and 2, a shaving razor 10 includes a handle 11 having a shaving razor yoke 14, an interface element 15, a return element 16, and a cartridge 13. The razor yoke 14 is disposed on one end of the handle 11 and is configured to support the shaving accessory 20. The cartridge includes a plurality of blades 12 disposed in a parallel manner with respect to each other and the long axis of the cartridge 13 and generally perpendicular to the long axis of the handle 11. The cartridge may be mounted on the handle in any desired manner, e.g., as described in U.S. patent application Ser. No. 13/938,638, the full disclosure of which is incorporated herein by reference. Preferably the manner of attachment allows the cartridge to pivot with respect to the handle.

The interface element 15 allows the cartridge 13 to be mounted on the handle 11, and provides pivoting of the cartridge during shaving. The return element 16 provides a return force during shaving. Details of this arrangement are disclosed in U.S. patent application Ser. No. 13/802,614, the full disclosure of which is incorporated herein by reference.

Figure 3:
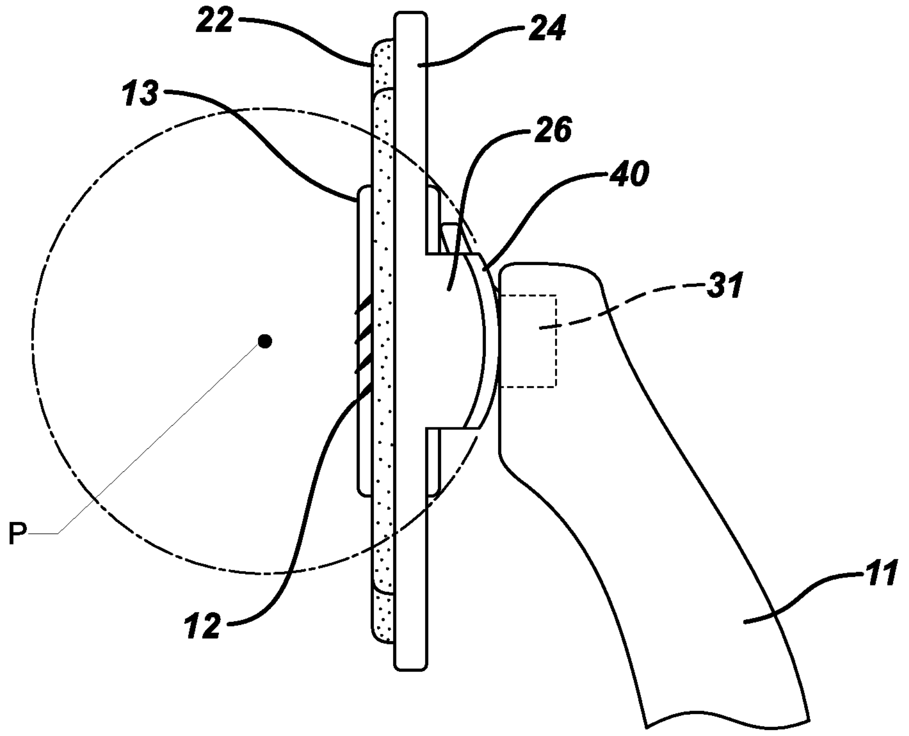
FIG. 3 is a side, sectional view of the accessory shown in FIG. 1.

Referring to FIGS. 1A and 2, the shaving accessory 20 is configured with an aperture or window 25 that is defined by plate 24. Window 25 is dimensioned to receive cartridge 13 when the shaving accessory is attached to the shaving razor. Plate 24 carries a plurality of shaving aid portions **22*a*-22*d*, which together define a shaving aid element 22. Shaving aid element 22 is mounted to the backside of plate 34 of the shaving accessory 20 so that the shaving aid portions come in contact with the user's skin during shaving. The razor blades 12 and cartridge 13 are configured to extend beyond the plane defined by the broad surfaces of shaving aid portions 22*a-d*, as seen in FIG. 3. This arrangement allows the blades to contact the skin for a close shave. The specifics of the shaving aid element 22** will be discussed in detail at a later point.

Referring to FIG. 2, the razor yoke 14 includes bores 33, 35 that are configured to receive magnets 31, 30. The magnets can be pressed in to the bores, co-molded into the yoke, chemically attached, e.g., by using an adhesive, or mounted using any other form of attachment.

Shaving accessory 20 includes corresponding ferrous plates 40, 41 that are positioned for releasable engagement with the magnets 31, 30. Plates 40, 41 are fixedly mounted, e.g. mechanically welded, co-molded, or chemically attached, to protrusions 26, 27. Protrusions 26, 27 extend from plate 24 and are preferably configured with convex surfaces 28, 29. The convex surfaces are disposed in parallel at opposing ends of the long axis of backing plate 24. The orientation and shape of surfaces 28, 29 permit pivoting movement of the shaving accessory during shaving about generally the same axis as the cartridge. Preferably, plates 40, 41 are formed of a ferrous metal, however, a ferric coating may be applied to plates or surfaces 28, 29. The convex configuration of the surfaces 28, 29 provides the shaving accessory with pivoting movement when mounted on the shaving razor handle 10.

Referring to FIG. 3, plates 40, 41 allow the shaving accessory 20 to pivot with respect to the handle 11, thus allowing the shaving accessory to adapt to the various surfaces and contours of the human body during shaving in much the same way that the cartridge is configured to pivot independently of the razor handle. Preferably, the shaving accessory 20 is not attached to the cartridge and is, therefore, able to move in an independent manner. The shaving accessory pivots about axis P through a limited arc.

Figure 4:
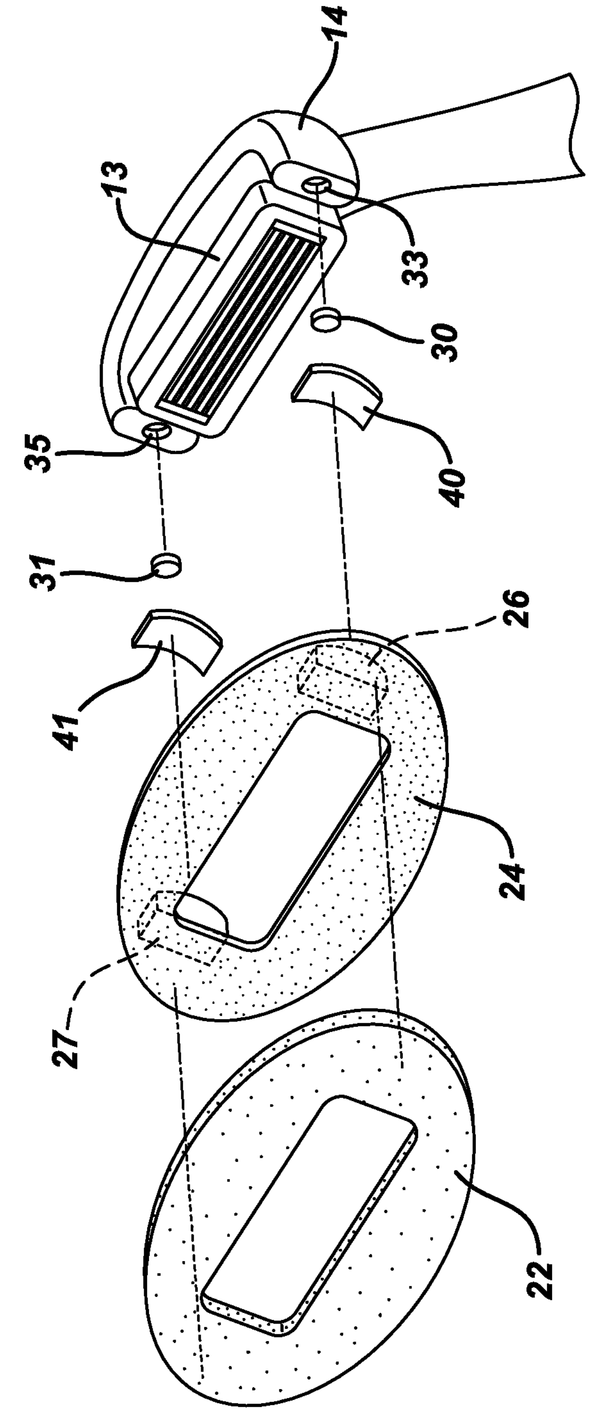
FIG. 4 is an exploded view of a shaving razor accessory according to an alternate embodiment.

The dual magnet/ferrous material configuration shown in FIGS. 2 and 4 advantageously ensures a releasable, secure connection between the handle 11 and the shaving accessory 20, while minimizing or eliminating unwanted lateral movement of the accessory when the cartridge is under load during shaving.

The magnetic interaction between the plates 40, 41 and the ferrous magnets 30, 31 is also sufficient to prevent unwanted detachment of the shaving accessory from the shaving razor. However, the magnetic interaction can be interrupted by the user applying an appropriate amount of force, resulting in the accessory detaching from the razor. The magnetic-attachment scheme allows the user to quickly and easily disengage the shaving accessory 20 from the handle 11 and reengage the accessory, or a different accessory, as needed. Disengaging the accessory from the razor would allow the user to shave certain areas of the body that otherwise would not be possible when the accessory is attached, for example, during detail shaving of small surface area skin portions. In addition, this attachment scheme allows the user to easily change between differently configured shaving accessories during the shaving process. For example, the user could utilize an accessory that includes a moisturizer on certain areas of the body or during certain shaving sessions, and an accessory that includes an exfoliator on others.

Referring to FIGS. 1A and 4, shaving aid element 22 is shown in two distinct forms: as four individual portions (**22*a*, 22*b*, 22*c*, 22*d*), as seen in FIG. 1A, and as one contiguous oval ring, as seen in FIG. 4**. Other configurations, arrangements and shapes of the shaving aids are possible as well.

Figure 6:
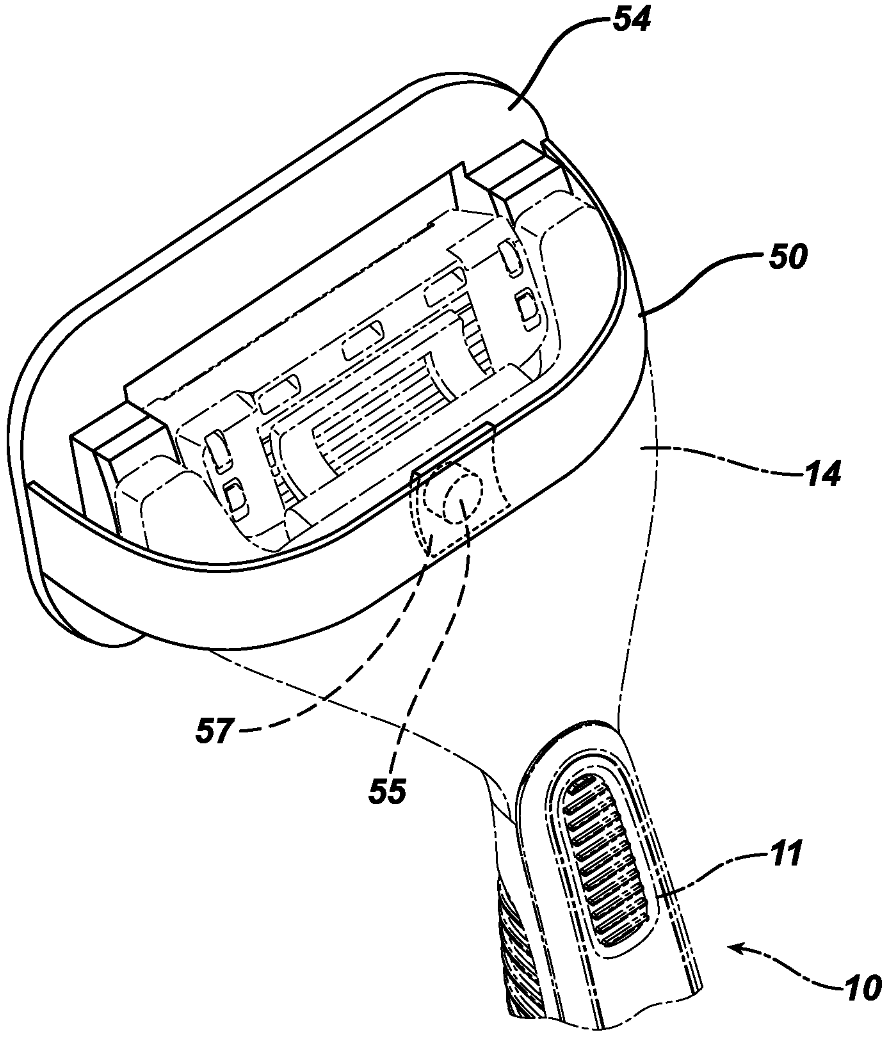
FIG. 6 is a perspective view of an accessory according to another embodiment mounted on a shaving razor.

Referring to FIG. 6, in an alternate embodiment a shaving accessory 54 includes a band 50 that is configured to removably secure the shaving accessory 54 to the yoke 14 of handle 11. Band 50 is preferably formed of a flexible material, and is configured to securely hold the shaving accessory in a predetermined orientation with respect to the cartridge. Similar to the embodiment previously discussed, ferrous element 57 is designed to interact with magnet 55 to removably secure the band and, therefore, the shaving accessory 54, in place on the handle 11. Preferably, magnet 55 is inset into yoke 14 and the ferrous element 57 is attached, either mechanically, chemically, or by co-molding, to band 50. The ferrous element 57 has an arcuate surface. Band 50 provides the shaving accessory 54 a certain amount of compliance during shaving, allowing the shaving accessory to adapt to varied body curvatures. This compliance would be similar to the pivoting functionality described above.

Figure 5:
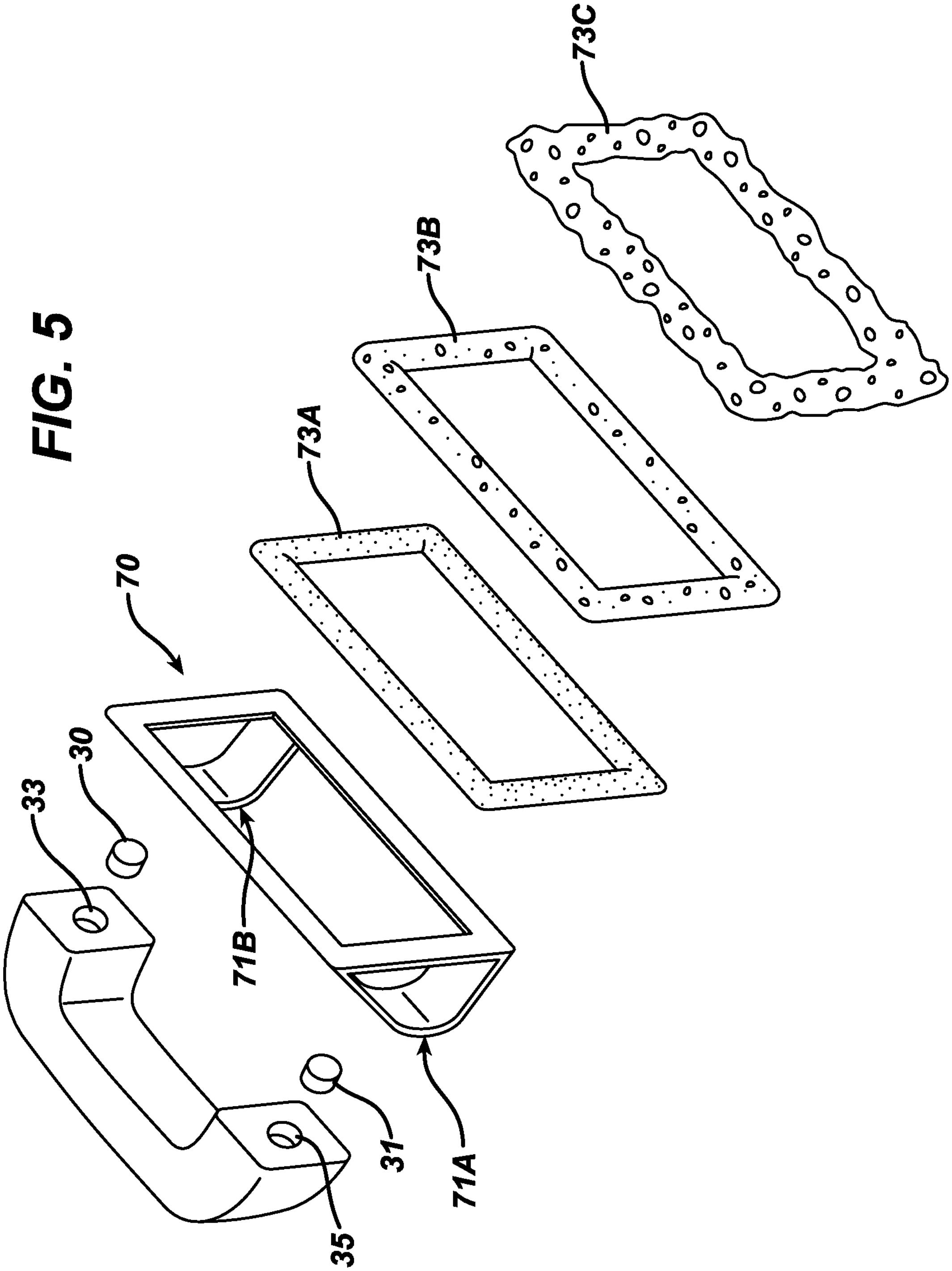
FIG. 5 is an exploded, perspective view of an accessory according to another alternate embodiment.
Figure 7:
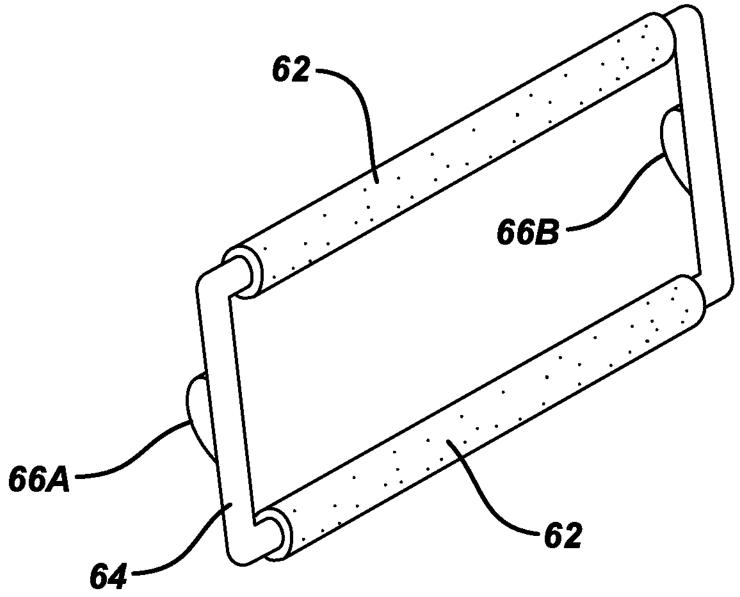
FIG. 7 is a perspective view of an accessory according to another embodiment.

Referring to FIGS. 5 and 7, the plate onto which the shaving aid element is mounted may take different forms. For example, plate 70 (FIG. 5) may be entirely formed of metal with integrally formed arcuate surfaces 71A, 71B. In this instance, the plate would be die cast, press formed, printed or formed in such a way that it would be one continuous piece. The shaving aid element would be applied, adhered, formed, cast or otherwise attached to the plate. FIG. 7 illustrates an example of an alternative means of attaching the shaving aid element 62, to plate (or frame) 64. In this instance, the shaving aid element 62 is wrapped around the frame 64, which may be achieved, for example, by a process commonly known as overmolding.

The shaving aid element can take various forms and have various compositions, which may be determined by the intended use. For example, the shaving aid element could be designed and formulated to exfoliate, lubricate, soap, moisturize, or any combination thereof. The shaving aid element may include, in some implementations, a shaving adjuvant, such as humectants, e.g., glycerine, propylene glycol and sorbitol, and emollients, e.g., lecithin and lanolin, and/or other skin-affecting ingredients such as exfoliating materials, e.g., apricot kernel particles, soaps, skin-soothing agents, e.g., aloe vera, botanical extracts, allantoin, and many others as is well known in the shaving art.

In some cases, the shaving aid element does not contain a shaving aid, but instead is designed to have a shaving aid applied thereto during use. For example, referring to FIG. 5, shaving aid element 73C could be a sponge or some other absorbing material that would absorb various products, for example a lotion-style soap, exfoliator, or any other desired product. Some shaving kits could be sold to users with a combination of various accessories having different types of shaving aid elements, and in some cases other complementary products such as moisturizers and after shave compositions. The various components of the kit could be utilized sequentially during shaving or otherwise as needed by the user.

In some implementations, the shaving aid elements may include one or more water soluble shaving adjuvants incorporated into an erodible polymer matrix. Suitable polymers for the matrix include, for example, nylon, ethylene-vinyl acetate copolymer, polyethylene, polypropylene, polystyrene, polyacetyl and combinations. Suitable shaving adjuvants include, for example, polyethylene oxide, polyvinyl pyrrolidone, polyacrylamide, hydroxypropyl cellulose, polyvinyl imidazoline, polyethylene glycol, polyvinyl alcohol, methylcellulose, starch, water soluble vinyl polymers (CARBOPOL® polymers sold by B.F. Goodrich), polyhydroxyethylmethacrylate, silicone copolymers, sucrose stearate, vitamin E, panthenol, aloe, essential oils such as methanol and combinations.

The plate or frame portion of the shaving accessory can be made of any suitable material including, for example, amorphous blends of polyphenylene ether and polystyrene, e.g., polymers sold under the tradename NORYL resins, acrylonitrile butadiene styrene (ABS), polystyrene, polyethylene terephthalate (PET or PETE), high density (HD) PETE, thermoplastic polymer, polypropylene, oriented polypropylene, polyurethane, polyvinyl chloride (PVC), polytetrafluoroethylene (PTFE), polyester, high-gloss polyester, nylon, or any combination thereof. The plate or frame portion of the shaving accessory 20 may also be constructed or formed of metals or metal alloys, or a combination of metals or metal alloys with any of the materials previously listed.

OTHER EMBODIMENTS

A number of embodiments have been described. Nevertheless, it will be understood that various modifications may be made without departing from the spirit and scope of the disclosure.

For example, alternative embodiments many feature more than two magnets.

Another embodiment may feature a yoke portion configured to grant a measure of compliance, such that the position of the broad surface of the shaving aid element relative to the cutting plane of the cartridge self-adjusts in response to shaving pressure. This compliance helps to ensure that ideal contact is maintained between the user's skin and the shaving aid element as the shaving aid element erodes during the useful life of the accessory. This in turn provides the benefit of the shaving aid element without compromising shaving efficacy. Compliance can be provided, for example, by forming all or one or more portions of the yoke of an elastomeric material, or by providing areas where the yoke can flex.

Another embodiment may feature alternatively sized accessories, either larger or smaller. Furthermore, the accessory may be shaped differently. For example, the backing plate or mounting frame of the accessory may be configured or shaped differently.

While shaving razors that include pivoting cartridges are discussed above, it should be understood that shaving razors having fixed (non-pivoting) cartridges can also be configured to accept the accessory attachment. In such cases, the arcuate surfaces of the ferrous plates may be omitted if pivoting of the accessory is not required. Similarly, while a removable cartridge attached to the handle by an interface element is described above the accessory may be used with disposable razors having a permanently attached cartridge.

Another embodiment may feature a shaving accessory that is configured without the ability to pivot while retaining the ability to be removably attached to the shaving razor.

Another embodiment of the invention may feature a shaving accessory that is configured to be removably attached to the shaving cartridge, rather than the handle, via magnetic interaction similar to that described previously.

Accordingly, other embodiments are within the scope of the following claims.

What is claimed is:

1. A shaving razor comprising:

a handle, a shaving cartridge, having a plurality of blades, mounted on a first portion of the handle, a return element engaging a back surface of the shaving cartridge and thereby providing a return force during shaving, and a shaving accessory comprising a body, the shaving accessory being removably mounted on a second portion of the handle by a magnetic attachment, the shaving accessory being mounted to pivot independently of the shaving cartridge, wherein the shaving accessory comprises a shaving aid element disposed on a first side of the body and configured to contact a user's skin while shaving; and wherein the magnetic attachment comprises engagement between at least one magnet mounted on the handle and at least one ferrous element on a second side of the body, the ferrous element having a convex ferric surface configured to contact the magnet and provide the independent pivoting of the shaving accessory relative to the handle.

2. The shaving razor of claim 1, wherein the body defines an aperture configured to receive the cartridge.

3. The shaving razor of claim 1, wherein the handle comprises a yoke portion, the razor comprises two magnets positioned at distal ends of the yoke portion, and the ferrous element comprises two plates disposed on the second surface of the body.

4. The shaving razor accessory of claim 1, wherein the body is composed entirely of a ferric material.

5. The shaving accessory of claim 1, wherein a portion of the body is coated with a ferric material.

6. The shaving accessory of claim 1, wherein the body includes a frame and the at least one ferrous element is mounted on the frame.

7. The shaving razor of claim 1, wherein the shaving aid element includes a shaving aid.

8. The shaving razor of claim 7, wherein the shaving aid has exfoliating characteristics.

9. The shaving razor of claim 7, wherein the shaving aid has lubricating characteristics.

10. The shaving razor of claim 7, wherein the shaving aid has moisturizing characteristics.

11. The shaving razor of claim 7, wherein the shaving aid has lathering characteristics.

12. The shaving razor of claim 1, wherein the razor includes at least two magnets and two ferrous elements.

13. The shaving razor of claim 1 wherein the shaving aid element is in the form of a generally oval ring surrounding the shaving cartridge.

14. The shaving razor of claim 1 wherein the shaving accessory can be removed from the second portion of handle without removing the shaving cartridge from the first portion of the handle.

15. The shaving razor of claim 1 wherein the cartridge is removably mounted on the handle to allow a user to remove and replace the cartridge.

* * * * *